US011838870B2

(12) United States Patent
Zou et al.

(10) Patent No.: US 11,838,870 B2
(45) Date of Patent: Dec. 5, 2023

(54) METHODS FOR REDUCING POWER CONSUMPTION OF A COMMUNICATION APPARATUS AND A COMMUNICATION APPARATUS UTILIZING THE SAME (71) Applicant: MediaTek Singapore Pte. Ltd., Singapore (SG)

(72) Inventors: Zhen Zou, Beijing (CN); Jianwei Zhang, Beijing (CN); Chih-Chieh Lai, Hsinchu (TW); Min Lei, Beijing (CN); Wenze Qu, Beijing (CN)

( * ) Notice: Subject to any disclaimer, the term of this patent is extended or adjusted under 35 U.S.C. 154(b) by 0 days.

(21) Appl. No.: 17/270,255

(22) PCT Filed: Aug. 30, 2018

(86) PCT No.: PCT/CN2018/103214
§ 371 (c)(1),
(2) Date: Feb. 22, 2021

(87) PCT Pub. No.: WO2020/042076
PCT Pub. Date: Mar. 5, 2020

(65) Prior Publication Data
US 2021/0337466 A1 Oct. 28, 2021

(51) Int. Cl.
H04W 52/02 (2009.01)
H04W 8/24 (2009.01)
(Continued)

(52) U.S. Cl.
CPC .......... H04W 52/028 (2013.01); H04W 8/24 (2013.01); H04W 60/06 (2013.01); H04W 92/10 (2013.01)

(58) Field of Classification Search
CPC .......... H04W 52/028; H04W 52/0274; H04W 52/0261; H04W 52/0209; H04W 8/18;
(Continued)

(56) References Cited

U.S. PATENT DOCUMENTS 5,491,721 A * 2/1996 Cornelius ............... H04L 27/00
379/93.09
7,174,179 B2 * 2/2007 Krebs ................... H04L 1/0015
455/504
(Continued)

FOREIGN PATENT DOCUMENTS

CN 101753658 A 6/2010

OTHER PUBLICATIONS

International Search Report and Written Opinion dated Jun. 6, 2019, issued in application No. PCT/CN2018/103214.
(Continued)

Primary Examiner — Jenee Holland
(74) Attorney, Agent, or Firm — Helen Mao; Zheng Jin; Imperium Patent Works (57) ABSTRACT A communication apparatus includes an antenna module, a radio transceiver and a processor. The radio transceiver transmits or receives wireless radio frequency signals to or from an air interface via the one or more antennas of the antenna module. The processor is configured to determine an actual communication capability of the communication apparatus, determine a reduced communication capability of the communication apparatus according to the actual communication capability, and report the reduced communication capability instead of the actual communication capability as a communication capability of the communication apparatus to a network device. A corresponding value of the reduced communication capability is smaller than a corresponding value of the actual communication capability.

20 Claims, 10 Drawing Sheets (51) Int. Cl.
*H04W 60/06* (2009.01)
*H04W 92/10* (2009.01)
*H04W 8/22* (2009.01)
*H04W 28/02* (2009.01)
*H04W 52/14* (2009.01)

(58) Field of Classification Search
CPC ....... H04W 8/24; H04W 60/00; H04W 60/06; H04W 92/10; H04L 29/08918
See application file for complete search history.

(56) References Cited

U.S. PATENT DOCUMENTS

| | | | | |
|---|---|---|---|---|
| 7,979,075 B2* | 7/2011 | Cheng | H04W 48/08 | 455/452.2 |
| 7,986,612 B2* | 7/2011 | Duan | H04L 1/0027 | 370/332 |
| 8,542,757 B2* | 9/2013 | Baker | H04L 1/0027 | 370/335 |
| 9,154,200 B2* | 10/2015 | Baker | H04B 7/0413 | |
| 9,219,571 B2* | 12/2015 | Barbieri | H04L 5/0091 | |
| 9,369,969 B2* | 6/2016 | Chang | H04W 52/143 | |
| 10,064,166 B1* | 8/2018 | Liu | H04W 28/0205 | |
| 11,102,733 B2* | 8/2021 | Ioffe | H04W 4/80 | |
| 2006/0058054 A1* | 3/2006 | Hiramatsu | H04W 52/40 | 455/525 |
| 2006/0203727 A1* | 9/2006 | Aizawa | H04L 1/0033 | 370/235 |
| 2007/0121547 A1* | 5/2007 | Huh | H04W 72/56 | 455/450 |
| 2007/0291720 A1* | 12/2007 | Lee | H04W 24/00 | 455/450 |
| 2008/0056414 A1* | 3/2008 | Kim | H04B 7/0632 | 375/347 |
| 2008/0085717 A1* | 4/2008 | Chhabra | G06F 9/5011 | 455/450 |
| 2008/0205491 A1* | 8/2008 | Berens | H04L 5/0044 | 375/346 |
| 2009/0116581 A1* | 5/2009 | Liau | H04L 25/03343 | 375/296 |
| 2009/0215442 A1 | 8/2009 | Lindoff et al. | | |
| 2010/0150114 A1* | 6/2010 | Che | H04L 1/0026 | 370/336 |
| 2011/0250919 A1* | 10/2011 | Barbieri | H04L 1/0026 | 455/509 |
| 2012/0076025 A1* | 3/2012 | Barbieri | H04W 24/10 | 370/252 |
| 2012/0140708 A1* | 6/2012 | Choudhury | H04L 1/0027 | 370/328 |
| 2013/0083755 A1* | 4/2013 | Berberana Fernandez-Murias | H04W 72/542 | 370/329 |
| 2013/0094384 A1* | 4/2013 | Park | H04L 1/0026 | 370/252 |
| 2013/0195070 A1* | 8/2013 | Bashar | H04W 52/0216 | 370/330 |
| 2013/0235849 A1* | 9/2013 | Ekici | H04L 1/0023 | 370/336 |
| 2013/0322376 A1* | 12/2013 | Marinier | H04B 7/0456 | 370/329 |
| 2013/0336214 A1* | 12/2013 | Sayana | H04B 7/024 | 370/328 |
| 2013/0343252 A1* | 12/2013 | Chakraborty | H04W 52/0261 | 370/311 |
| 2014/0010126 A1* | 1/2014 | Sayana | H04L 5/0035 | 370/336 |
| 2014/0355548 A1* | 12/2014 | Xia | H04L 5/0094 | 370/329 |
| 2015/0038156 A1* | 2/2015 | Kilpatrick, II | H04W 52/50 | 455/561 |
| 2015/0071083 A1* | 3/2015 | Rocchetti | H04L 1/0025 | 370/242 |
| 2015/0078271 A1* | 3/2015 | Kim | H04L 5/0026 | 370/329 |
| 2015/0085829 A1* | 3/2015 | Bawaskar | H04W 36/0085 | 370/332 |
| 2015/0092768 A1* | 4/2015 | Ng | H04J 11/0069 | 370/350 |
| 2015/0098392 A1* | 4/2015 | Homchaudhuri | H04W 48/20 | 370/329 |
| 2015/0281912 A1* | 10/2015 | Cai | H04L 1/1671 | 370/329 |
| 2015/0289155 A1* | 10/2015 | Gao | H04L 5/005 | 370/252 |
| 2015/0341092 A1* | 11/2015 | Park | H04B 7/0617 | 370/329 |
| 2015/0358915 A1* | 12/2015 | Semaan | H04W 52/365 | 370/329 |
| 2016/0134405 A1* | 5/2016 | Luo | H04L 1/0078 | 370/328 |
| 2016/0149684 A1* | 5/2016 | Zhao | H04B 7/063 | 370/252 |
| 2016/0330789 A1* | 11/2016 | Goto | H04W 48/18 | |
| 2016/0345119 A1* | 11/2016 | Futaki | H04W 72/0413 | |
| 2017/0099129 A1* | 4/2017 | Buthler | H04W 24/10 | |
| 2017/0164250 A1* | 6/2017 | Kim | H04W 88/02 | |
| 2017/0237478 A1* | 8/2017 | Kwak | H04L 5/0023 | 370/329 |
| 2018/0242243 A1* | 8/2018 | Kela | H04B 7/0417 | |
| 2019/0053158 A1* | 2/2019 | Kumar | H04W 52/0229 | |
| 2020/0014430 A1* | 1/2020 | Zhang | H04B 7/0619 | |
| 2020/0053801 A1* | 2/2020 | Hosseini | H04W 72/0413 | |
| 2020/0235797 A1* | 7/2020 | Kim | H04W 72/085 | |
| 2020/0280352 A1* | 9/2020 | Park | H04B 7/0469 | |
| 2021/0337466 A1* | 10/2021 | Zou | H04W 60/06 | |
| 2022/0052732 A1* | 2/2022 | Sun | H04L 5/0057 | |
| 2022/0394527 A1* | 12/2022 | Mittal | H04B 7/0695 | |

OTHER PUBLICATIONS

Chinese language office action dated Jul. 3, 2020, issued in application No. TW 108129750.
China Intellectual Property Office Action, dated Jan. 5, 2023 (8 pages).

* cited by examiner

METHODS FOR REDUCING POWER CONSUMPTION OF A COMMUNICATION APPARATUS AND A COMMUNICATION APPARATUS UTILIZING THE SAME

TECHNICAL FIELD

The invention generally relates to wireless communication, and, more particularly, to methods for reducing power consumption in wireless communication.

BACKGROUND

The term "wireless" normally refers to an electrical or electronic operation, which is accomplished without the use of a "hard wired" connection. "Wireless communication" is the transfer of information over a distance without the use of electrical conductors or wires. The distances involved may be short (a few meters for television remote controls) or very long (thousands or even millions of kilometers for radio communication). The best known example of wireless communication is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

Communication technologies have been developed rapidly. For example, Long-Term Evolution (LTE) is a standard for wireless communication of high-speed data for mobile phones and data terminals. It is based on the GSM/EDGE and UMTS/HSPA network technologies, increasing the capacity and speed using a different radio interface together with core network improvements. 5th Generation (5G) New Radio (NR) 5G NR is a newly developed wireless communication technology.

In order to provide more efficient communication services and improve user experience, methods for reducing power consumption of a communication apparatus in wireless communication are sought.

SUMMARY

Communication apparatuses and methods for reducing power consumption of a communication apparatus are provided. An exemplary embodiment of a communication apparatus comprises an antenna module, a radio transceiver and a processor. The antenna module comprises one or more antennas. The radio transceiver transmits or receives wireless radio frequency signals to or from an air interface via the one or more antennas of the antenna module. The processor is configured to determine an actual communication capability of the communication apparatus, determine a reduced communication capability of the communication apparatus according to the actual communication capability, and report the reduced communication capability instead of the actual communication capability as a communication capability of the communication apparatus to a network device. A corresponding value of the reduced communication capability is smaller than a corresponding value of the actual communication capability.

An exemplary embodiment of a method for reducing power consumption of a communication apparatus, the communication apparatus comprising an antenna module, a radio transceiver and a processor, the antenna module comprising one or more antennas, comprises: determining an actual communication capability of the communication apparatus; determining a reduced communication capability of the communication apparatus according to the actual communication capability; and reporting the reduced communication capability instead of the actual communication capability as a communication capability of the communication apparatus to a network device. A corresponding value of the reduced communication capability is smaller than a corresponding value of the actual communication capability.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
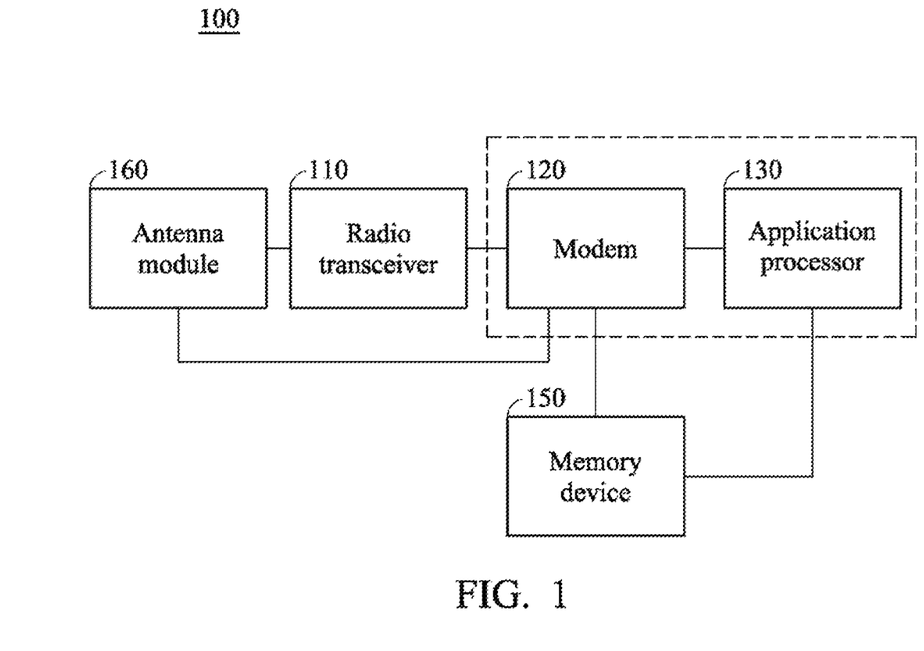
FIG. 1 shows an exemplary block diagram of a communication apparatus according to an embodiment of the invention.

FIG. 1 shows an exemplary block diagram of a communication apparatus according to an embodiment of the invention. The communication apparatus 100 may be a portable electronic device, such as a Mobile Station (MS, which may be interchangeably referred to as User Equipment (UE)). The communication apparatus 100 may comprise at least an antenna module 160, a radio transceiver 110, a modem 120, an application processor 130, and a memory device 150. The antenna module 160 comprises one or more antennas. One antenna may be an antenna matrix. The radio transceiver 110 may receive wireless radio frequency signals from an air interface via the antenna module, transmit wireless radio frequency signals to the air interface via the antenna module and perform RF signal processing. For example, the radio transceiver 110 may convert the received signals into intermediate frequency (IF) or baseband signals to be processed, or receive the IF or baseband signals from the modem 120 and convert the received signals into wireless radio frequency signals to be transmitted to a network device. According to an embodiment of the invention, the network device may be a cell, an evolved node B, a base station, a Mobility Management Entity (MME) etc., at the network side and communicating with the communication apparatus 100 via the wireless radio frequency signals.

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portions of the RF signals and/or a mixer for performing radio frequency conversion. According to an embodiment of the invention, the radio frequency may be, for example, 900 MHz or 1800 MHz for a Global System for Mobile communication (GSM), or 1900 MHz for a Universal Mobile Telecommunication System (UMTS), or the frequency of any specific frequency band for a Long-Term Evolution (LTE) system, etc.

The modem 120 may be a cellular communication modem configured for handling cellular system communication protocol operations and processing the IF or baseband signals received from or to be transmitted to the radio transceiver 110. The application processor 130 is configured for running the operating system of the communication apparatus 100 and running application programs installed in the communication apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The memory device 150 may be coupled to the modem 120 and application processor 130 and may store system data or user data. The memory device 150 may store program instructions to control the operations of the communication apparatus 100.

It should be noted that, in order to clarify the concept of the invention, FIG. 1 presents a simplified block diagram in which only the elements relevant to the invention are shown. For example, in some embodiments of the invention, the communication apparatus may further comprise some peripheral devices not shown in FIG. 1. In another example, in some embodiments of the invention, the communication apparatus may further comprise a central controller coupled to the modem 120 and the application processor 130. Therefore, the invention should not be limited to what is shown in FIG. 1.

Figure 2:
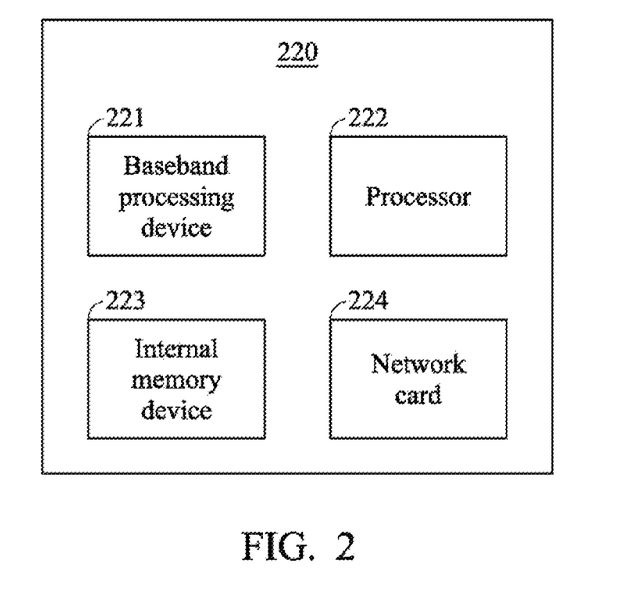
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, a encoder for signal encoding, a decoder for signal decoding, and so on.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The internal memory device 223 may store system data and user data for the modem 220. The processor 222 may also access the internal memory device 223.

The network card 224 provides Internet access services for the communication apparatus. It should be noted that, although the network card 224 shown in FIG. 2 is configured inside of the modem, the invention should not be limited thereto. In some embodiments of the invention, the communication apparatus may also comprise a network card configured outside of the modem, or the communication apparatus may also be coupled to an external network card for providing Internet access services. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be noted that in some embodiments of the invention, the modem may comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be noted that in some embodiments of the invention, the baseband processing device 221 and the processor 222 may be integrated into one processing unit, and the modem may comprise one or more such processing units, for supporting multi-RAT operations. Therefore, the invention should not be limited to what is shown in FIG. 2.

Figure 3:
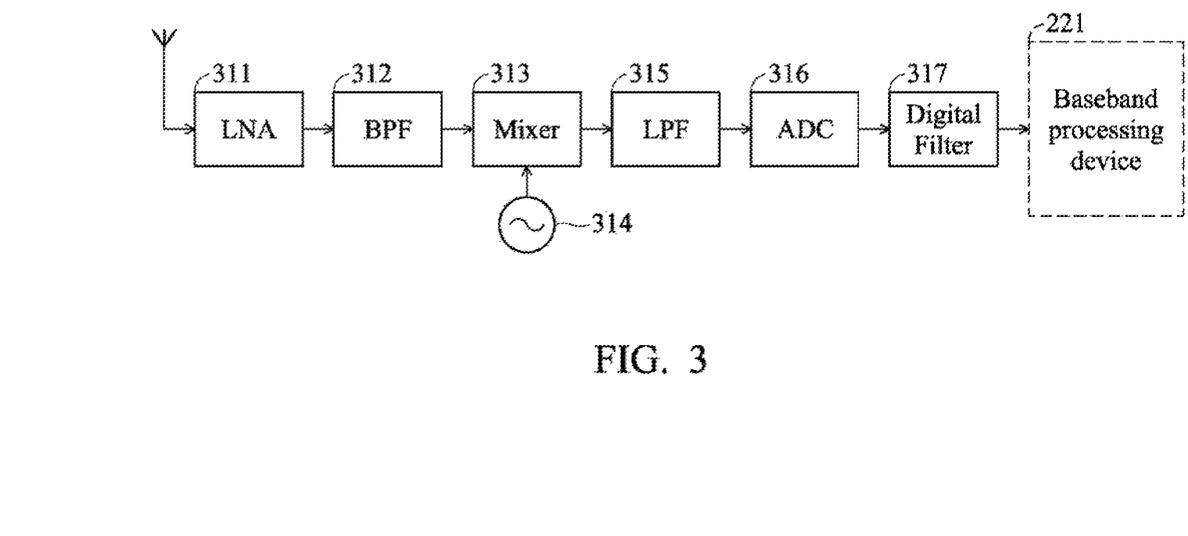
FIG. 3 shows an exemplary block diagram of a front-end signal processing circuit configured in the radio transceiver according to an embodiment of the invention.

FIG. 3 shows an exemplary block diagram of a front-end signal processing circuit configured in the radio transceiver according to an embodiment of the invention. The front-end signal processing circuit may comprise a low noise amplifier LNA 311, a bandpass filter BPF 312, a mixer 313 coupled to an oscillator 314, a low pass filter LPF 315, an ADC 316 and a digital filter 317. According to an embodiment of the invention, the front-end signal processing circuit may be coupled to one or more antennas in the antenna module 160. Therefore, in the embodiments of the invention, the radio transceiver 110 may comprise one or more front-end signal processing circuits, and each is configured to perform front-end signal processing on the RF signals received by one or more antennas.

Note that FIG. 3 is only one of a plurality of possible implementations of a front-end signal processing circuit. Those who are skilled in this technology will readily appreciate that, for different system requirements, various alterations and combinations of signal processing devices can be made to implement different designs for a front-end signal processing circuit. Therefore, the invention should not be limited thereto.

Figure 4:
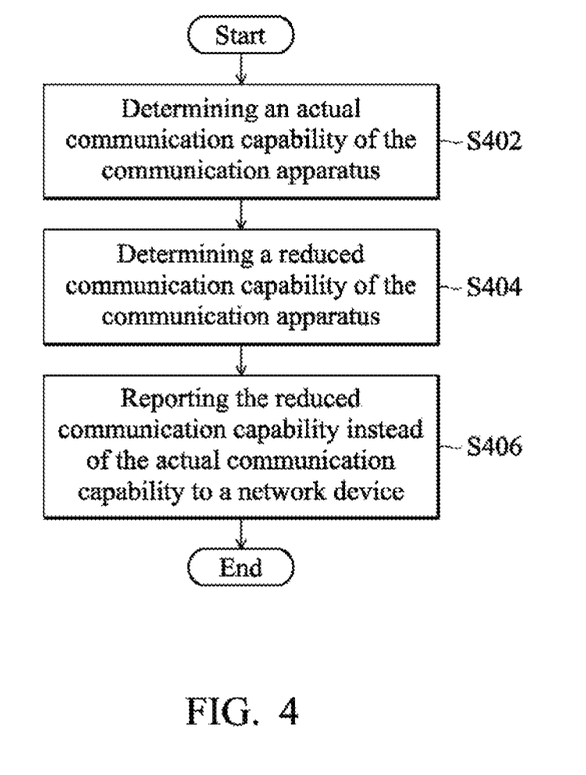
FIG. 4 is an exemplary flow chart of a method for reducing power consumption of the communication apparatus according to an embodiment of the invention.

FIG. 4 is an exemplary flow chart of a method performed by the processor 222 of the communication apparatus 100 for reducing power consumption of the communication apparatus 100 according to an embodiment of the invention. According to an embodiment of the invention, the processor 222 may be configured to determine an actual communication capability of the communication apparatus, for instance, according to configurations of the antennas of the antenna module, a channel quality, and/or a modem voltage (Step S402). According to an embodiment of the invention, the actual communication capability of the communication apparatus may be determined based on one or more, or any combination of the following factors, comprising a number of the antennas configured in the antenna module, the type and/or capability of the antennas configured in the antenna module, the configurations of the antennas, the number of component carrier (CC) that can be supported by the communication apparatus 100, the number of MIMO layers or streams that can be supported by the communication apparatus 100, the number of modulation types that can be supported by the communication apparatus 100, the number of coding schemes that can be supported by the communication apparatus 100, the Signal to Interference plus Noise Ratio (SINR) of a communications channel in which the transmissions of the communication apparatus 100 take place, the block error rate (BLER) of the transmissions in the communications channel, . . . etc. According to an embodiment of the invention, the number of CCs that can be supported by the communication apparatus 100 and the number of layers or streams that can be supported by the communication apparatus 100 may be determined based on the number, capability and/or configurations of the antennas and the signal processing capability of the signal processing devices (such as signal processing device in the front-end signal processing circuit and the baseband processing device). In addition, the number of modulation types and coding schemes that can be supported by the communication apparatus 100 may be determined based on the computation ability of the modem 120.

Next, the processor 222 may be configured to determine a reduced communication capability of the communication apparatus according to the actual communication capability (Step S404). According to an embodiment of the invention, the actual communication capability and the reduced communication capability may be represented by at least a corresponding value, and the corresponding value of the reduced communication capability is smaller than the corresponding value of the actual communication capability.

Next, the processor 222 may be configured to report the reduced communication capability instead of the actual communication capability as a communication capability of the communication apparatus to a network device (Step S406).

Generally, the processor 222 of the communication apparatus 100 reports the actual communication capability that can actually reveal the true communication capability of the communication apparatus 100 to the network device, and the corresponding value of the actual communication capability is usually set to the maximum or the best one. As an example, when the number of the antennas configured in the antenna module is 4, the corresponding value of the actual communication capability related to the number of the antennas is set to 4. As another example, when the number of CC that can be supported by the communication apparatus can be 1, 2 or 4, the corresponding value of the actual communication capability related to the number of supported CC is set to 4.

However, in the embodiments of the invention, when the processor 222 determines that the current traffic is a low throughput traffic which has a throughput requirement lower than a predetermined threshold, or the current traffic requires a MCS with an index lower than a predetermined threshold, or the current traffic is a low power consumption traffic which usually consumes power lower than a predetermined threshold, the processor 222 may be configured to perform the method as illustrated above to reduce power consumption of the communication apparatus.

According to an embodiment of the invention, when the processor 222 reports the reduced communication capability instead of the actual communication capability as the communication capability of the communication apparatus to the network device, the network device may configure the subsequent communication based on the reported communication capability. The reported communication capability may carry information regarding the traffic configuration recommended by the communication apparatus 100. The network device may configure the subsequent communication based on the reported communication capability by following the recommended traffic configuration. Note that even if the network device does not completely follow the recommended traffic configuration, the network device may still configure the subsequent communication without exceeding the reported communication capability of the communication apparatus. Therefore, when the processor 222 reports the reduced communication capability instead of the actual communication capability as the communication capability of the communication apparatus to the network device, the power consumption of the communication apparatus can be reduced.

Figure 5A:
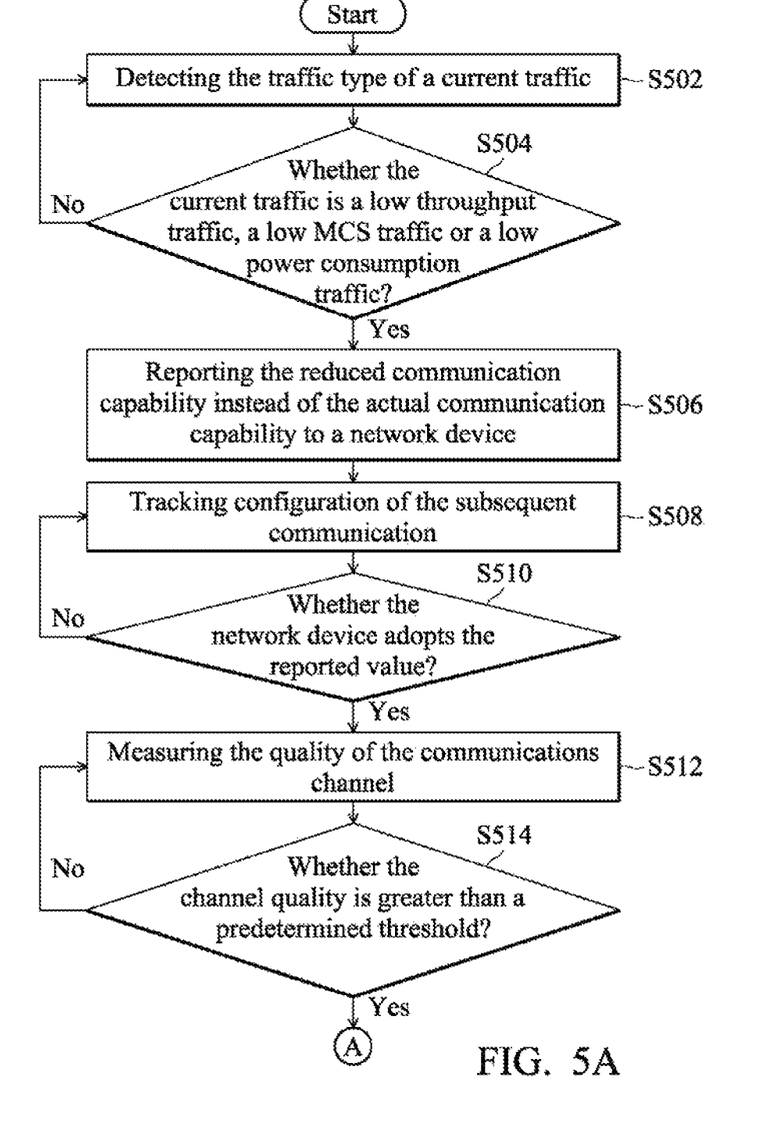
FIGS. 5A and 5B show an exemplary flow chart of a method for reducing power consumption of the communication apparatus according to a first embodiment of the invention.
Figure 5B:
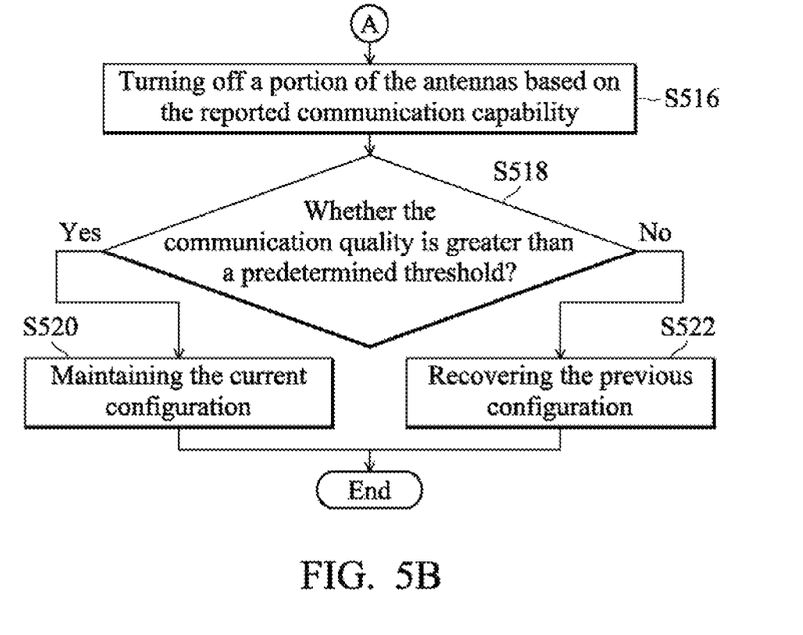

FIGS. 5A and 5B show an exemplary flow chart of a method performed by the processor 222 of the communication apparatus 100 for reducing power consumption of the communication apparatus 100 according to a first embodiment of the invention. First of all, when the communication apparatus 100 operates in the RRC connected mode (that is, when the RRC connection setup is completed), the processor 222 may perform scenario detection to detect the traffic type of a current traffic (Step S502). According to an embodiment of the invention, the processor 222 may detect the traffic type according to a transport block size (TBS) and a guaranteed bit rate (GBR) of the current traffic. As an example, when the TBS is smaller than a predetermined threshold and/or the GBR is smaller than or equal to a predetermined threshold, the processor 222 may determine that the traffic type of a current traffic is voice over LTE (VoLTE).

Next, the processor 222 may determine whether the current traffic is a low throughput traffic, a low MCS traffic or a low power consumption traffic (Step S504). The processor 222 may determine whether the current traffic is a low throughput traffic, a low MCS traffic or a low power consumption traffic based on the traffic type detected in step S502. As discussed above, when the current traffic is a low throughput traffic which has a throughput requirement lower than a predetermined threshold, or the current traffic requires a MCS with an index lower than a predetermined threshold, or current traffic is a low power consumption traffic which usually consumes power lower than a predetermined threshold, the processor 222 may determine that the current traffic is a low throughput traffic, a low MCS traffic or a low power consumption traffic. Note that the throughput requirement and the MCS requirement is usually predefined by the corresponding standards.

When the processor 222 determines that the current traffic is not a low throughput traffic, a low MCS traffic or a low power consumption traffic, the process returns to step S502.

When the processor 222 determines that the current traffic is a low throughput traffic, a low MCS traffic or a low power consumption traffic, the processor 222 may report the reduced communication capability instead of the actual communication capability as a communication capability of the communication apparatus to a network device (Step S506). Note that before reporting the reduced communication capability, the processor 222 may determine the actual communication capability of the communication apparatus and determine the reduced communication capability as discussed above.

According to an embodiment of the invention, the processor 222 is configured to report the value of the reduced communication capability in a Channel State Information (CSI) reporting procedure. The processor 222 may periodically or aperiodically report the CSI to the network device. The processor 222 may carry the CSI report on the Physical Uplink Control Channel (PUCCH) or the Physical Uplink Shared Channel (PUSCH). The communication capability may comprise the Channel Quality Indicator (CQI), the Precoding Matrix Indicator (PMI), Precoding Type Indicator (PTI) and the Rank Indicator (RI).

According to an embodiment of the invention, the processor 222 may report a reduced RI having a value that is smaller than the actual RI to the network device as a communication capability of the communication apparatus 100. As an example, when the communication apparatus 100 comprises at least two antennas in the antenna module 160 and is capable of supporting at least two streams, the layer for the two streams is set to 2 (or above), and the processor 222 may report the value of the layer as the RI value to the network device. However, instead of reporting RI=2, in step S506, the processor 222 may determine to report RI=1 to the network device.

According to another embodiment of the invention, the processor 222 may report a reduced CQI having a value that is smaller than the actual CQI to the network device as a communication capability of the communication apparatus 100. As an example, the processor 222 may determine the actual CQI value based on the measured SINR and/or the BLER. However, instead of reporting the actual CQI value, in step S506, the processor 222 may determine to report a reduced CQI value to the network device.

After reporting the reduced communication capability to the network device, the processor 222 may track the configuration of the subsequent communication (Step S508) and determine whether the network device adopts or follows the reported value (the recommended value) (Step S510). As an example, the processor 222 may track the stream number or the MCS configured in the subsequent communication to determine whether the network device adopts or follows the reported value (the recommended value). As an example, the processor 222 may check the MCS configured for a subframe based on the Downlink Control Indicator (DCI) carried in the Physical Downlink Control Channel (PUCCH). When the network device did not adopt the reported value, the process returns to step S508.

When the network device adopts the reported value, the processor 222 may further measure the quality of the communications channel (Step S512) and determine whether the channel quality is greater than a predetermined threshold (Step S514). As an example, the processor 222 may measure the SNR or the SINR of the communications channel and determine whether the SNR or the SINR is greater than a predetermined threshold.

When the channel quality is not greater than the predetermined threshold, the process returns to step S512. That is, the processor 222 may not further take any action until the channel quality is good enough.

When the channel quality is greater than the predetermined threshold, the processor 222 may turn off a portion of the antennas based on the reported communication capability (Step S516). The processor 222 may issue corresponding commands to turn off a portion of the antennas. To further reduce the power consumption, the processor 222 may further issue corresponding commands to turn off the front-end signal processing circuit corresponding to the antenna(s) that is/are determined to be turned off is step S516, such that the corresponding TX/RX path(s) will be turned off. According to an embodiment of the invention, when the processor 222 determines to turn off the front-end signal processing circuit, the processor 222 may control one or more devices shown in FIG. 3 to be turned off within a predetermined time period. For example, the processor 222 may transmit a command to the devices, so as to trigger the corresponding firmware to power down the corresponding devices.

Next, the processor 222 may further check whether the communication quality is greater than a predetermined threshold after turning off a portion of the TX/RX path(s) (Step S518). When the communication quality is greater than the predetermined threshold, the processor 222 may maintain the current configuration (Step S522). That is, the processor 222 may keep turning off devices in the portion of the TX/RX path(s) to reduce power consumption. When the communication quality is not greater than the predetermined threshold, the processor 222 may recover the previous configuration (Step S524). That is, the processor 222 may issue corresponding commands to turn on the antennas and the corresponding device in the front-end signal processing circuit to resume transmission/reception via the portion of the TX/RX path(s). Note that in some embodiments of the invention, the recovery step may further comprise reporting the actual communication capability to the network device.

Figure 6:
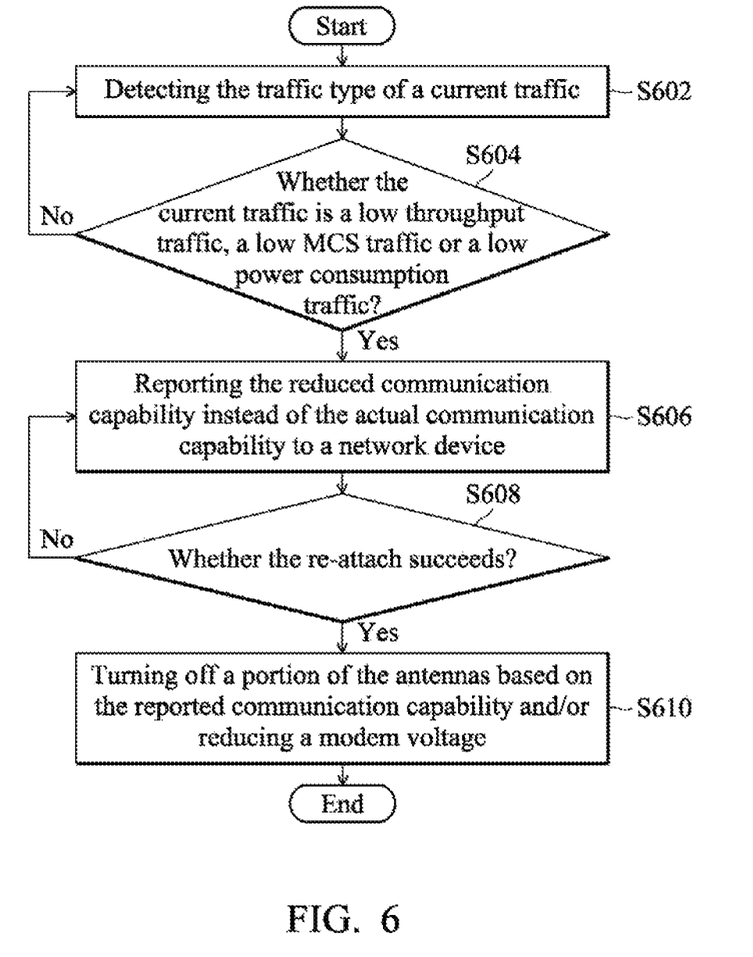
FIG. 6 is an exemplary flow chart of a method for reducing power consumption of the communication apparatus according to a second embodiment of the invention.

FIG. 6 is an exemplary flow chart of a method performed by the processor 222 of the communication apparatus 100 for reducing power consumption of the communication apparatus 100 according to a second embodiment of the invention. First of all, when the communication apparatus 100 operates in the RRC connected mode (that is, when the RRC connection setup is completed), the processor 222 may perform scenario detection to detect the traffic type of a current traffic (Step S602). As discussed above, the processor 222 may detect the traffic type according to a transport block size (TBS) and a guaranteed bit rate (GBR) of the current traffic.

Next, the processor 222 may determine whether the current traffic is a low throughput traffic, a low MCS traffic or a low power consumption traffic (Step S604). As discussed above, when the current traffic is a low throughput traffic which has a throughput requirement lower than a predetermined threshold, or the current traffic requires a MCS with an index lower than a predetermined threshold, or current traffic is a low power consumption traffic which usually consumes power lower than a predetermined threshold, the processor 222 may determine that the current traffic is a low throughput traffic, a low MCS traffic or a low power consumption traffic.

When the processor 222 determines that the current traffic is not a low throughput traffic, a low MCS traffic or a low power consumption traffic, the process returns to step S602.

When the processor 222 determines that the current traffic is a low throughput traffic, a low MCS traffic or a low power consumption traffic, the processor 222 may report the reduced communication capability instead of the actual communication capability as a communication capability of the communication apparatus to a network device (Step S606). Note that before reporting the reduced communication capability, the processor 222 may determine the actual communication capability of the communication apparatus and determine the reduced communication capability as discussed above.

According to an embodiment of the invention, the processor 222 is configured to report the value of the reduced communication capability in an attach procedure (or a re-attach procedure). According to an embodiment of the invention, the reported communication capability may be a value related to a throughput supported by the communication apparatus or a category supported by the communication apparatus.

Figure 7A:
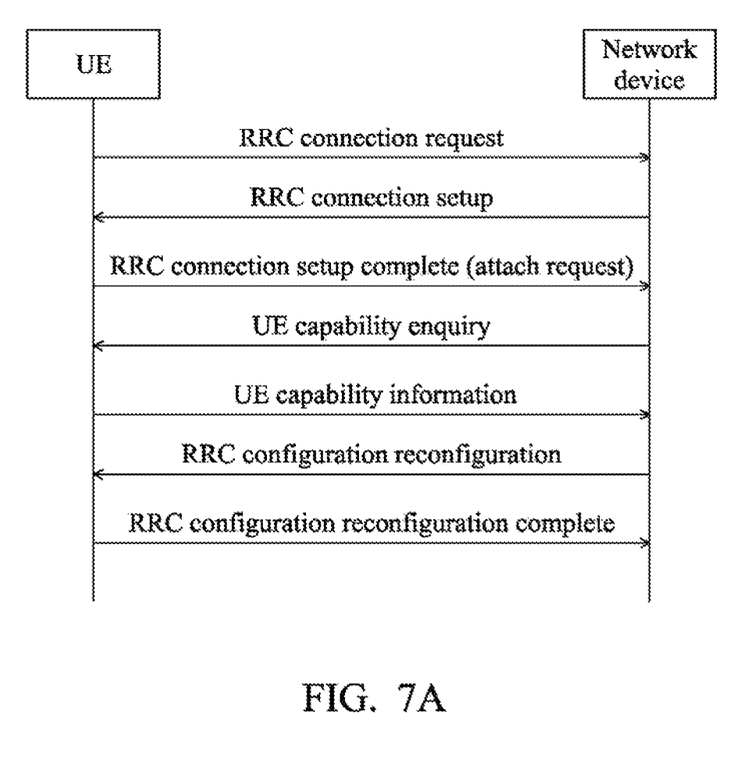
FIG. 7A is an exemplary diagram showing a message flow for the communication apparatus to report its communication capability an attach procedure.

FIG. 7A is an exemplary diagram showing a message flow for the communication apparatus (UE) to report its communication capability an attach procedure. The UE may send an RRC connection request message to the network device. Upon receiving the RRC connection request message, the network device may send an RRC connection setup message to the UE. Upon receiving the RRC connection setup message, the UE may further send an RRC connection setup complete message, which comprises an attach request, to the network device. Upon receiving the attach request, the network device may accept the request or reject the request.

When the network device accepts the request, the network device may further send a UE capability enquiry message to the UE, to query the communication capability of the UE. Upon receiving the UE capability enquiry message, the UE may send the UE capability information to the network device. The capability information may comprise a category supported by the communication apparatus (wherein one category is related to a predefined throughput), a number of CC supported by the UE, a number of antennas supported by the UE, a MIMO order supported by the UE, a modulation type order supported by the UE . . . etc.

Upon receiving the UE capability information, the network device may configure the radio resource of the UE based on the reported UE capability information and send an RRC configuration reconfiguration message, which comprises an attach accept, to the UE. Upon receiving the RRC configuration reconfiguration message, the UE may send an RRC configuration reconfiguration complete message to the network device.

Figure 7B:
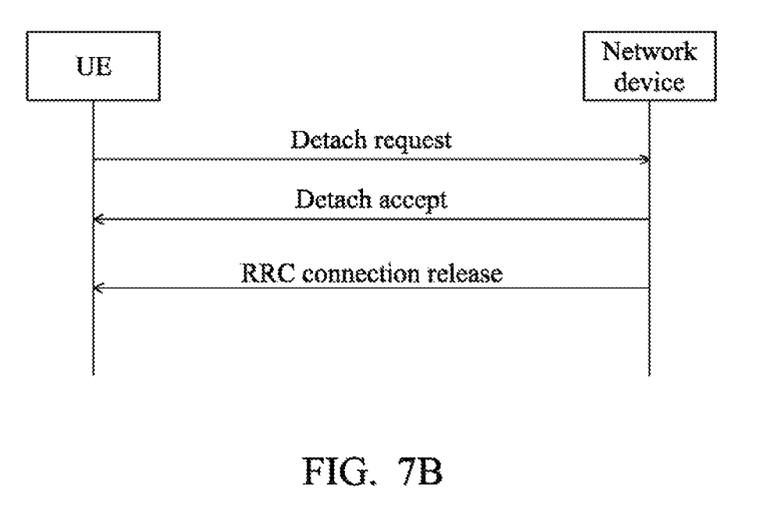
FIG. 7B is an exemplary diagram showing a message flow when performing a detach procedure.

FIG. 7B is an exemplary diagram showing a message flow when performing a detach procedure. The UE may send a detach request message to the network device. Upon receiving the detach request message, the network device may accept the request and send a detach accept message to the UE. The network device may then release the UE context and send an RRC connection release message to the UE.

In the embodiments of the invention, because the communication apparatus has reported its capability information in a previous attach procedure, when the processor 222 determines to report the reduced communication capability instead of the actual communication capability as its capability to the network device in Step S606, the processor 222 may first perform a detach procedure as shown in FIG. 7B to detach from the network device and then perform an attach procedure as shown in FIG. 7A to re-attach to the network device. In the attach procedure, the reduced communication capability may be reported in the UE capability information message upon receiving the UE capability enquiry message.

Referring back to FIG. 6, after reporting the reduced communication capability, the processor 222 may further check whether the re-attach succeeds (Step S608). When the processor 222 receives the attach accept message, the processor 222 may determine that re-attach succeeds. When the re-attach does not succeed, the process returns to step S606. When the re-attach succeeds, the processor 222 may turn off devices in the portion of the TX/RX path(s) as discussed above and/or reduce a modem voltage to reduce power consumption (Step S610). According to an embodiment of the invention, the modem voltage may be the voltage utilized by the processor 222, a hardware accelerator, a digital signal processing circuit, or others in the modem 120, for processing the downlink data.

Figure 8:
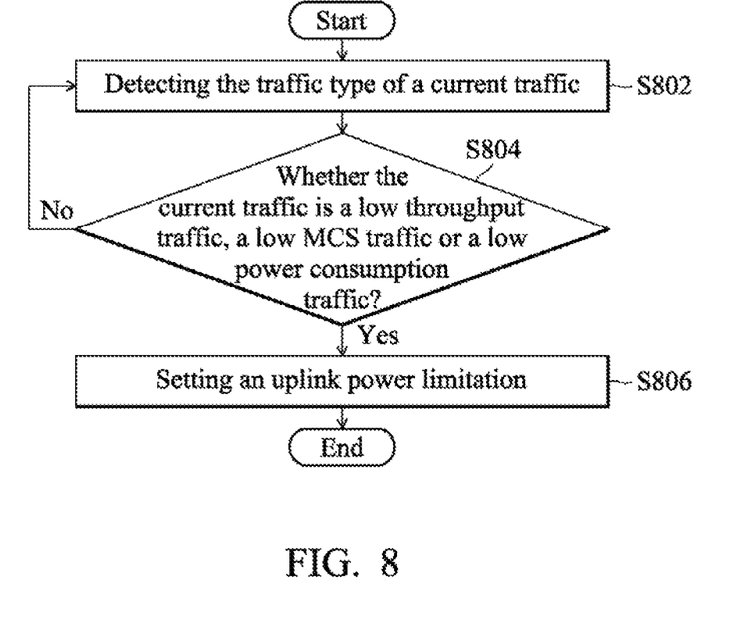
FIG. 8 is an exemplary flow chart of a method for reducing power consumption of the communication apparatus according to a third embodiment of the invention.

FIG. 8 is an exemplary flow chart of a method performed by the processor 222 of the communication apparatus 100 for reducing power consumption of the communication apparatus 100 according to a third embodiment of the invention. First of all, when the communication apparatus 100 operates in the RRC connected mode (that is, when the RRC connection setup is completed), the processor 222 may perform scenario detection to detect the traffic type of a current traffic (Step S802). As discussed above, the processor 222 may detect the traffic type according to a transport block size (TBS) and a guaranteed bit rate (GBR) of the current traffic.

Next, the processor 222 may determine whether the current traffic is a low throughput traffic, a low MCS traffic or a low power consumption traffic (Step S804). As discussed above, when the current traffic is a low throughput traffic which has a throughput requirement lower than a predetermined threshold, or the current traffic requires a MCS with an index lower than a predetermined threshold, or current traffic is a low power consumption traffic which usually consumes power lower than a predetermined threshold, the processor 222 may determine that the current traffic is a low throughput traffic, a low MCS traffic or a low power consumption traffic.

When the processor 222 determines that the current traffic is not a low throughput traffic, a low MCS traffic or a low power consumption traffic, the process returns to step S802.

When the processor 222 determines that the current traffic is a low throughput traffic, a low MCS traffic or a low power consumption traffic, the processor 222 may set a lower uplink power limitation value comparing to a normal or high traffic condition. For instance, in normal or high traffic condition, the uplink power limitation value may be set to be a threshold. If the current traffic is a low throughput traffic, a low MCS traffic or a low power consumption traffic, the uplink power limitation value may be set to be lower than the threshold. According to an embodiment of the invention, the uplink power limitation may be the maximum per-carrier transmit power Pcmax as defined by the corresponding standards, and the processor 222 may set the uplink power limitation by setting a corresponding register.

It should be noted that in the embodiments of the invention, no matter whether the processor has eventually turned off any device in the TX/RX path(s) or not, as long as the processor has reported the reduced communication capability having a lower value than the actual communication capability to the network device, the power consumption of the communication apparatus may possibly be reduced. This is because that once the reduced communication capability is reported, the computation complexity required by processing the data received from the network device or to be transmitted to the network device can be accordingly reduced. Therefore, even if there is only one antenna comprised in the antenna module or even if the processor does not turn off any antenna and/or the signal processing device in the TX/RX path(s), reduction of the power consumption can still be achieved as long as the processor has reported the reduced communication capability instead of the actual communication capability to the network device.

In addition, it should be noted that the embodiments as discussed above do not conflict with each other. That is, the processor 222 may perform any or some or all of them to achieve the result of power consumption reduction. Therefore, the invention is not limited thereto any individual embodiment as discussed above.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:

1. A communication apparatus, comprising:
an antenna module, comprising one or more antennas;
a radio transceiver, coupled to the antenna module and capable of transmitting or receiving wireless radio frequency signals to or from an air interface via the one or more antennas; and
a processor, configured to
determine an actual communication capability of the communication apparatus, wherein the actual communication capability represents a true configuration and measurements of the communication apparatus,
determine a traffic type of a current traffic, and
report a reduced communication capability as a communication capability of the communication apparatus to a network device upon detecting the traffic type of the current traffic is at least one of low traffic types comprising a low throughput traffic, a low modulation and coding scheme traffic, and a low power consumption traffic, wherein the reduced communication capability indicates reduced capability referenced to the determined actual communication capability.

2. The communication apparatus as claimed in claim 1, wherein the processor is configured to report the value of the reduced communication capability in a Channel State Information (CSI) reporting procedure.

3. The communication apparatus as claimed in claim 1, wherein the communication capability is a rank indicator (RI).

4. The communication apparatus as claimed in claim 1, wherein the communication capability is a Channel Quality Indicator (CQI).

5. The communication apparatus as claimed in claim 1, wherein the processor is configured to report the value of the reduced communication capability in an attach procedure.

6. The communication apparatus as claimed in claim 1, wherein the communication capability is related to a throughput supported by the communication apparatus.

7. The communication apparatus as claimed in claim 1, wherein the communication capability is a category supported by the communication apparatus.

8. The communication apparatus as claimed in claim 1, wherein the processor is further configured to
monitor a success indication of adapting the reported reduced communication capability from the network device, and
turn off a portion of the antennas based on the reported communication capability when detecting the success indication.

9. The communication apparatus as claimed in claim 1, wherein the processor is further configured to decrease a modem voltage based on the reported communication capability.

10. The communication apparatus as claimed in claim 1, wherein the processor is further configured to set an uplink power limitation value to be lower than a threshold.

11. A method for reducing power consumption of a communication apparatus, the communication apparatus comprising an antenna module, a radio transceiver and a processor, the antenna module comprising one or more antennas, the method comprising:
determining an actual communication capability of the communication apparatus, wherein the actual communication capability represents a true configuration and measurements of the communication apparatus;
determining a traffic type of a current traffic; and
reporting a reduced communication capability as a communication capability of the communication apparatus to a network device upon detecting the traffic type of the current traffic is at least one of low traffic types comprising a low throughput traffic, a low modulation and coding scheme traffic, and a low power consumption traffic, wherein the reduced communication capability indicates reduced capability referenced to the determined actual communication capability.

12. The method as claimed in claim 11, wherein the step of reporting the reduced communication capability is performed in a Channel State Information (CSI) reporting procedure.

13. The method as claimed in claim 11, wherein the communication capability is a rank indicator (RI).

14. The method as claimed in claim 11, wherein the communication capability is a Channel Quality Indicator (CQI).

15. The method as claimed in claim 11, wherein the step of reporting the reduced communication capability is performed in an attach procedure.

16. The method as claimed in claim 11, wherein the communication capability is related to a throughput supported by the communication apparatus.

17. The method as claimed in claim 11, wherein the communication capability is a category supported by the communication apparatus.

18. The method as claimed in claim 11, further comprising:

monitor a success indication of adapting the reported reduced communication capability from the network device, and turning off a portion of the antennas based on the reported communication capability when detecting the success indication.

19. The method as claimed in claim 11, further comprising:

decreasing a modem voltage based on the reported communication capability.

20. The method as claimed in claim 11, further comprising:

setting an uplink power limitation value to be lower than a threshold.

* * * * *